United States Patent [19]

Gillery

[11] 4,320,155
[45] Mar. 16, 1982

[54] METHOD FOR COATING AN ARTICLE TO ALTERNATELY REFLECT AND ABSORB SOLAR ENERGY

[75] Inventor: F. Howard Gillery, Allison Park, Pa.

[73] Assignee: PPG Industries, Inc., Pittsburgh, Pa.

[21] Appl. No.: 172,612

[22] Filed: Jul. 28, 1980

Related U.S. Application Data

[62] Division of Ser. No. 866,448, Jan. 3, 1978, Pat. No. 4,235,048.

[51] Int. Cl.³ .......................... C23C 13/02; B05D 1/36
[52] U.S. Cl. .................................... 427/160; 427/164; 427/166; 427/167
[58] Field of Search ................ 427/160, 164, 166, 167

[56] References Cited

U.S. PATENT DOCUMENTS

| | | | |
|---|---|---|---|
| 2,327,918 | 8/1943 | Miller | 88/60 |
| 3,457,138 | 7/1969 | Miller | 161/196 |
| 3,537,944 | 11/1970 | Grubb et al. | 161/4 |
| 3,846,152 | 11/1974 | Franz | 117/33.3 |
| 3,925,945 | 12/1975 | White | 52/171 |
| 3,935,351 | 1/1976 | Franz | 428/34 |
| 3,990,784 | 11/1976 | Gelber | 350/166 |

OTHER PUBLICATIONS

Drummetter, et al., *Physics of Thin Films*, vol. 2, pp. 305-361, "Solar Absorptance and Thermal Emittance of Evaporated Coatings".

*Primary Examiner*—James R. Hoffman
*Attorney, Agent, or Firm*—Donna L. Seidel

[57] ABSTRACT

A method is disclosed for making a multiple layer coating which enables a window unit to function efficiently as a solar energy collector in winter and as a heat shield in summer. The coating comprises a layer of metal which provides high reflectance of incident solar energy from one side of a coated transparent substrate and a layer which provides high absorption of incident solar energy by the other side of the coated substrate. The absorbing layer may be a single film of a highly absorptive material, but is preferably a dual film of an absorptive material covered by an antireflective material. The absorptive layer may also comprise multiple alternating films of metal and dielectric materials which effectively absorb incident solar energy. The reflective and absorptive layers are selected to provide the coating article with a low U-value to prevent heat radiation from the warm building to the cold environment in winter and from the hot environment to the cooled building in summer.

5 Claims, 3 Drawing Figures

METHOD FOR COATING AN ARTICLE TO ALTERNATELY REFLECT AND ABSORB SOLAR ENERGY

CROSS REFERENCE TO RELATED APPLICATIONS

This application is a division of U.S. Ser. No. 866,448 filed Jan. 3, 1978 entitled "Reversible Window Unit for Alternately Reflecting and Absorbing Solar Energy" now U.S. Pat. No. 4,235,068.

BACKGROUND OF THE INVENTION

1. Field of the Invention

The present invention relates generally to coated glass articles and more particularly to a mulitple layer coating on a transparent substrate, especially in a multiple glazed window unit.

2. The Prior Art

More efficient use of energy in the heating and cooling of residential and commercial buildings can be achieved by employing insulating window units, especially those with coated surfaces which selectively reflect, transmit or absorb incident solar energy.

In U.S. Pat. No. 3,925,945, White discloses a transparent insulating building panel having a pivotally mounted frame enclosing a heat absorbing glass pane spaced from an insulating panel comprising two panes of clear glass separated by a clear air space and including apertures in the frame providing free air paths through the space between the heat absorbing glass and the insulating panel.

In U.S. Application Ser. No. 791,350, filed on Apr. 27, 1977, now U.S. Pat. No. 4,081,934, Franz discloses a seasonally adjustable window including four spaced glass sheets, the outer sheets being selectively coated to provide a low shading coefficient in the summer position, a higher shading coefficient and a 50 percent reflectance of low temperature radiation in the winter position, and a low U-value.

In U.S. Pat. No. 3,990,784, Gelber discloses an architectural glass system having a multilayer coating comprising first and second metal layers and a dielectric material such as silicon dioxide, magnesium fluoride or aluminum oxide disposed between the metal films. Gelber teaches that the transmission of the coating can be changed independently of its reflection properties by varying the individual thickness of the metal layers while maintaining the ratio of the layer thicknesses constant.

In "Solar Absorptance and Thermal Emittance of Evaporated Coatings", *Physics of Thin Film*, Vol. 2, pp. 305–361, Drummeter and Haas discuss surface properties and temperature control in relation to objects in space and solar energy conversion. Silicon oxide and aluminum oxide films on aluminum substrates as front surface mirrors for satellites are disclosed.

SUMMARY OF THE INVENTION

Figure 1:
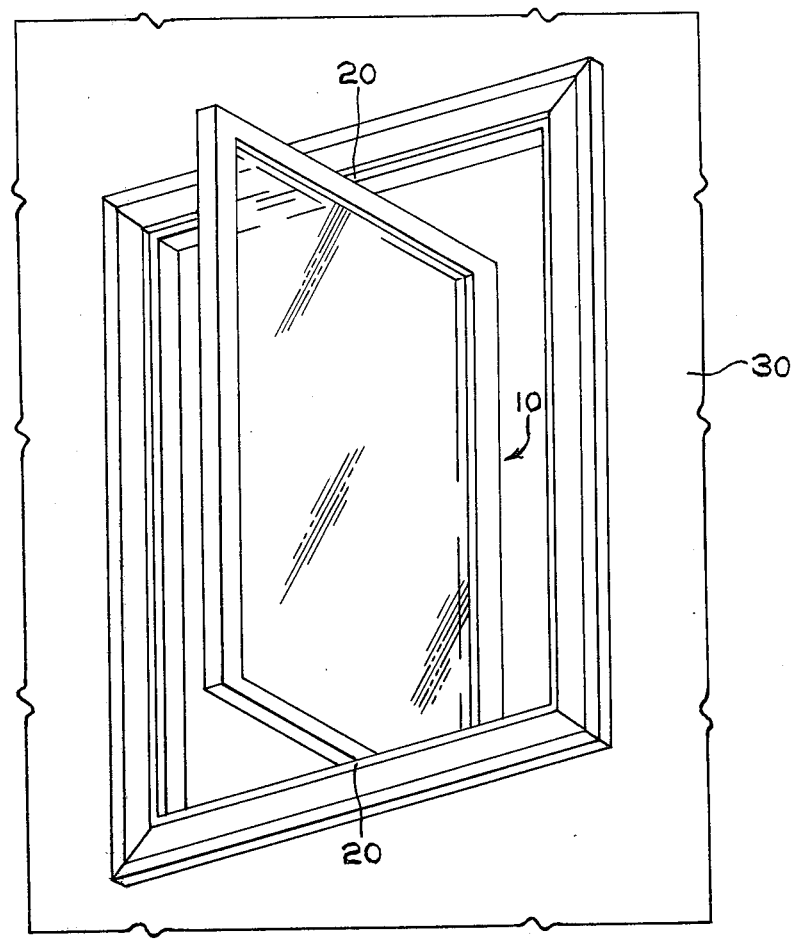
FIG. 1 is an isometric view illustrating a reversible window unit 10 pivotally mounted 20 in a wall opening 30.
Figure 2:
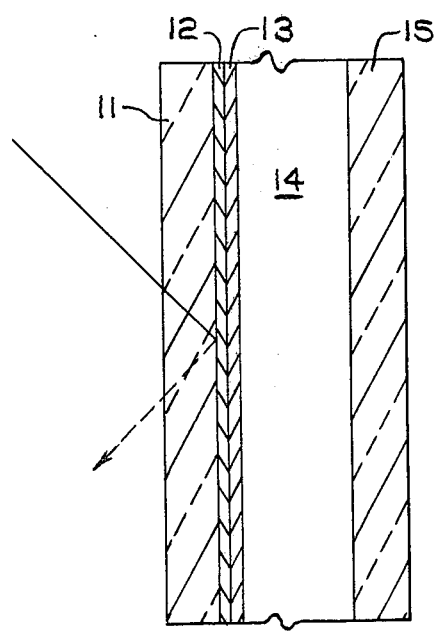
FIG. 2 is a partial cross-sectional view of a seasonally adjustable double glazed window according to the present invention in the summer position. Incident solar energy transmitted through a transparent substrate 11 is largely reflected by a layer of metal 12.
Figure 3:
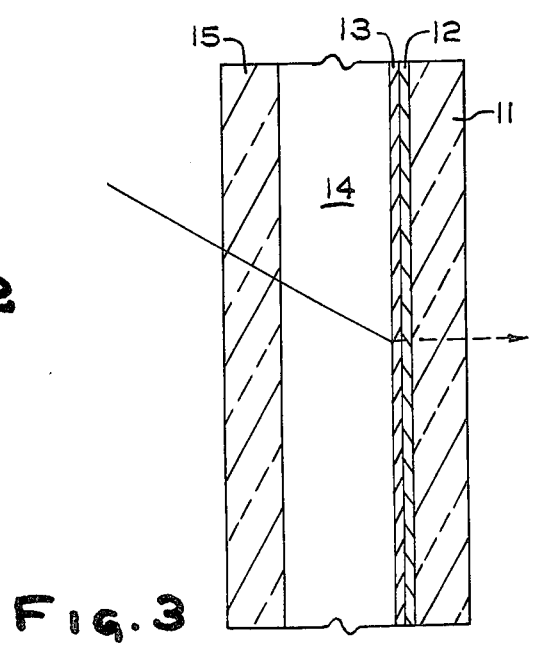
FIG. 3 is similar to FIG. 2 but shows the unit in the winter position. Incident solar energy transmitted through transparent substrate 15 and space 14 is largely absorbed by coating layer 13. A significant portion of the energy is conducted through the metal coating layer 12 and substrate 11 to the interior space of the building.

The present invention involves a method for making a novel coated article comprising a transparent substrate, a coating layer which reflects solar energy, and a coating layer which absorbs solar energy. The reflective coating layer is a metal film with high reflectance such as aluminum, chromium, platinum or molybdenum. The absorptive layer may be a single film of a material with high absorptance such as germanium or silicon. However, the absorption of such materials is preferably enhanced by an additional film of an antireflective material such as silicon oxide or magnesium fluoride. The absorptive layer may also comprise alternating films of metal and dielectric materials which effectively absorb incident solar energy. The coated article is useful as a window and can be employed as a solar heat shield by facing the metal film toward the sun or as a solar energy collector by facing the absorbing layer toward the sun. The coated article is most useful as a pane in a double glazed window unit which is reversible so that the functions may be alternatingly performed. The metal film provides maximum reflection of solar energy when the unit is in the summer position and the absorbing layer permits maximum absorption of solar energy when the unit is in the winter position. The multiple layer coating of the present invention has a low emissivity in the room temperature range of the radiation spectrum and provides the unit with a low U-value. This prevents heat radiation from the warm building to the cold environment in winter and from the hot environment to the cooled building in the summer.

Coatings useful according to the present invention, that is, coatings which result in high absorption by the coated side, high reflection from the glass side, and a low U-value, include aluminum/silicon/magnesium fluoride, aluminum/germanium/silicon monoxide, aluminum/silicon dioxide/chromium/silicon dioxide and others.

Optimum performance is obtained with a multiple layer coating of aluminum/germanium/silicon monoxide on glass. The aluminum provides high reflection from the glass side of the coated article. The germanium provides high absorption by the coated side. The silicon monoxide provides antireflective properties which enhance the absorption capability of the germanium layer. An additional feature of this combination of coating layers is that the color of a double glazed unit as observed through the uncoated pane can be changed from yellow to green to red to blue simply by varying the thickness of the silicon monoxide layer without significantly affecting the solar energy performance of the unit.

DETAILED DESCRIPTION OF THE PREFERRED EMBODIMENT

The present invention is a method for making multiple layer coating preferably on the inside surface of one pane of a reversible double glazed window unit which enables the unit to perform with maximum efficiency as a heat shield in summer and as a heat collector in winter. The multiple layer coating comprises a layer of metal preferably deposited on a glass surface which faces the enclosed space in the unit. This layer effectively reflects a significant portion of incident solar energy when the coated glass is the outside pane in the double glazed unit. The preferred metals include aluminum, chromium, platinum, or molybdenum, but more commonly deposited metals such as silver, gold or copper may also be used. The coating further comprises a layer which effectively absorbs a significant portion of incident solar energy when the coated glass is the inside pane in the double glazed unit. The absorbing layer may be a single film of a material with high absorptance such as silicon, germanium and other semiconducting materials having an absorption edge between 1 and 4 microns. However, it is preferred to employ an antireflective film over the silicon or germanium in order to enhance the absorption capability. Such materials as silicon oxides, aluminum oxides, a magnesium fluoride and other dielectric materials provide such antireflective properties while transmitting the infrared portion of the incident solar radiation for absorption by the silicon or germanium. The absorbing layer may also comprise multiple alternating films of metal and dielectric materials which effectively absorb incident solar energy. Solar radiation absorbed by the absorbing layer of the coating is transferred primarily by conduction through the metal layer and the glass substrate to the interior of the building.

In a most preferred embodiment of the present invention, a sheet of typical soda-lime-silica glass is coated by vacuum deposition. The substrate is placed in an airtight coating chamber and the chamber is evacuated to below $5 \times 10^{-4}$ Torr, preferably below $1 \times 10^{-4}$ Torr. The substrate temperature is typically ambient but may be elevated for the deposition of some materials, such as magnesium fluoride, to about 300° C. The maximum temperature for the substrate is limited by its softening point. The first coating layer, preferably aluminum, platinum or molybdenum, and most preferably aluminum, is deposited by evaporating the metal from a suitable source such as a heated tungsten strip or a water-cooled electron beam gun crucible and condensing the evaporated metal on the substrate. Deposition of the metal is preferably continued unit a luminous reflectance from the coated surface of about 50 to 60 percent is obtained. The second coating layer is preferably a dual film of high absorptance germanium or silicon with antireflective silicon oxide or magnesium fluoride. The high absorptance material is evaporated in the same manner as the metal and condensed on the metal film. Deposition is preferably continued until a reflectance from the coated surface of about 25 percent is obtained. Finally, the antireflective material, preferably silicon oxide, is evaporated in like manner and condensed on the absorptive material. Deposition is continued until the reflectance from the coated surface is very low, preferably about 1 percent or less. The thicknesses of the coating layers are preferably such that the final luminous transmittance of the coated article is at least about 5 percent and preferably in the range of 8 to 20 percent.

The multiple coated glass has high reflection from the glass surface due to the reflective metal layer and high absorption by the coated surface due to the combination of the high absorptance germanium layer with the antireflective silicon monoxide layer. The reflectance from the glass side is preferably at least about 40 percent while the absorption by the coated surface is at least about 40 percent and is peferably more than 60 percent.

The multiple coated glass surface preferably has a low emissivity in the low temperature radiation portion of the spectrum, 2 to 50 microns, to prevent the radiation of heat from the warm building to the cold environment in the winter and from the hot environment to the cooled building in the summer. In other words, the coating should give the unit a low shading coefficient, preferably less than about 0.6, and a low U-value, which is the overall coefficient of thermal transfer, preferably less than about 0.5 BTU/hour-square foot—°F. (about 2.8 watts/square meter—°C.).

The present invention will be further understood from the description of a specific example which follows.

EXAMPLE I

A sheet of 90 mil (about 2.25 millimeters) thick soda-lime-silica glass is vacuum coated with a first layer of aluminum, a second layer of germanium and a third layer of silicon monoxide to a final luminous transmittance of about 20 percent. The monolithic multiple coated glass has the following properties. Total luminous reflectance from the glass surface (summer position) is about 55 percent. Absorption by the film surface (winter position) is about 79 percent. The monolithic multiple coated glass sheet has a summer shading coefficient, which is the ratio of its solar heat gain to the solar heat gain of monolithic clear sheet glass, of 0.28.

The above example is offered to illustrate the present invention. Variations and modifications of the above are included in the scope of the invention. For example, the first coating layer may be a metal other than aluminum, such as chromium, platinum, molybdenum, silver, gold or copper, so long as it imparts the desired reflectance properties to the unit. Likewise, the exterior coating layer may be an antireflective material other than silicon oxide, such as alumina or magnesium floride. The high absorptance layer may be a semiconducting material other than germanium or silicon so long as the desired absorption is obtained. The absorbing layer may comprise multiple alternating reflective and antireflective films which effectively absorb incident solar energy rather than a film of high absorptance material. For example, multiple layer coatings such as Al/SiO/Ge/SiO, Al/SiO/Cr/SiO, Pt/SiO$_2$/Pt/SiO$_2$, and Al/SiO/Al/SiO are included. The scope of the present invention is defined by the following claims.

I claim:

1. A method for making a coated article for alternately reflecting and absorbing incident solar energy comprising the steps of:
   a. placing a transparent substrate in an air-tight coating chamber;
   b. evacuating said chamber to less than $5 \times 10^{-4}$ Torr;
   c. evaporating and condensing to form a film, in sequence, the following materials:
      (1) a reflective metal;
      (2) an absorptive material selected from the group consisting of semiconducting materials with an absorption edge in the range of about 1 to 4 microns; and
      (3) an antireflective material selected from the group consisting of silicon oxides, aluminum oxides, and magnesium fluoride.

2. The method according to claim 1, wherein the metal is selected from the group consisting of aluminum, chromium, platinum, molybdenum, silver, gold and copper.

3. The method according to claim 2, wherein:
a. the metal is selected from the group consisting of aluminum, chromium, platinum and molybdenum; and
b. the absorptive material is selected from the group consisting of germanium and silicon.

4. The method according to claim 3, wherein the metal is aluminum, the absorptive material is germanium and the antireflective material is silicon oxide.

5. The method according to claim 4, wherein the evaporating and condensing of the materials is carried out to a sufficient extent to deposit:
a. an aluminum film from which the reflectance is about 50 to 60 percent;
b. a germanium film from which the reflectance is about 25 percent; and
c. a silica film from which the reflectance is about 1 percent or less.

* * * * *